United States Patent

Yasukawa et al.

(10) Patent No.: US 10,074,221 B2
(45) Date of Patent: Sep. 11, 2018

(54) MOVING BODY CONTROL APPARATUS, MOVING BODY CONTROL METHOD AND NON-TRANSITORY COMPUTER READABLE RECORDING MEDIUM

(71) Applicant: FUJI XEROX CO., LTD., Tokyo (JP)

(72) Inventors: Kaoru Yasukawa, Kanagawa (JP); Masayasu Takano, Kanagawa (JP); Kazutoshi Yatsuda, Kanagawa (JP); Takaaki Kashiwagi, Kanagawa (JP); Ryosuke Nakanishi, Kanagawa (JP); Daigo Kusano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/363,736

(22) Filed: Nov. 29, 2016

(65) Prior Publication Data

US 2017/0301158 A1    Oct. 19, 2017

(30) Foreign Application Priority Data

Apr. 15, 2016 (JP) ................. 2016-082048

(51) Int. Cl.
*G07C 5/08* (2006.01)
*H04L 29/08* (2006.01)

(52) U.S. Cl.
CPC .......... *G07C 5/0841* (2013.01); *H04L 67/12* (2013.01)

(58) Field of Classification Search
CPC .................................................. G07C 5/0841
See application file for complete search history.

(56) References Cited

U.S. PATENT DOCUMENTS 8,554,403 B2    10/2013  Tsuchikiri et al.
9,043,079 B2 *   5/2015  Tsuchikiri ............... B60R 25/00
                                            701/29.9

FOREIGN PATENT DOCUMENTS

| JP | 2005-049914 A | 2/2005 |
| JP | 2009-116383 A | 5/2009 |
| JP | 4414470 B1    | 2/2010 |
| JP | 4928532 B2    | 5/2012 |

* cited by examiner

*Primary Examiner* — Basil T. Jos
(74) *Attorney, Agent, or Firm* — Oliff PLC (57) ABSTRACT

Provided is a moving body control apparatus including a collection unit that collects date and time data, position data, and first operating data of a moving body and a controller that controls the moving body based on a result of comparison between reference operating data corresponding to the date and time data and the position data, and the first operating data, wherein, when a difference between second operating data in case of an accident and third operating data in case of no accident meets a predetermined condition, the reference operating data is generated based on the third operating data.

6 Claims, 10 Drawing Sheets

| VEHICLE ID | TIME DATA | POSITION DATA | OPERATING DATA ||||| |
|---|---|---|---|---|---|---|---|
| | | | SPEED | NUMBER OF ENGINE REVOLUTION | SHIFT GEAR POSITION | ACCELERATOR OPENING | STEERING ANGLE | ... |

| TIME DATA | POSITION DATA | WEATHER DATA |
|---|---|---|
| | | |

MOVING BODY CONTROL APPARATUS, MOVING BODY CONTROL METHOD AND NON-TRANSITORY COMPUTER READABLE RECORDING MEDIUM

CROSS-REFERENCE TO RELATED APPLICATIONS

This application is based on and claims priority under 35 USC 119 from Japanese Patent Application No. 2016-082048 filed Apr. 15, 2016.

BACKGROUND

Technical Field

The present invention relates to a moving body control apparatus, a moving body control method and a non-transitory computer readable recording medium.

SUMMARY

According to an aspect of the invention, there is provided a moving body control apparatus including:

a collection unit that collects date and time data, position data, and first operating data of a moving body; and a controller that controls the moving body based on a result of comparison between reference operating data corresponding to the date and time data and the position data, and the first operating data, wherein, when a difference between second operating data in case of an accident and third operating data in case of no accident meets a predetermined condition, the reference operating data is generated based on the third operating data.

BRIEF DESCRIPTION OF THE DRAWINGS

Exemplary embodiments of the present invention will be described in detail based on the following figures, wherein.

DETAILED DESCRIPTION

Hereinafter, an exemplary embodiment suitable to achieve the present invention will be described with reference to the accompanying drawings.

Figure 1:
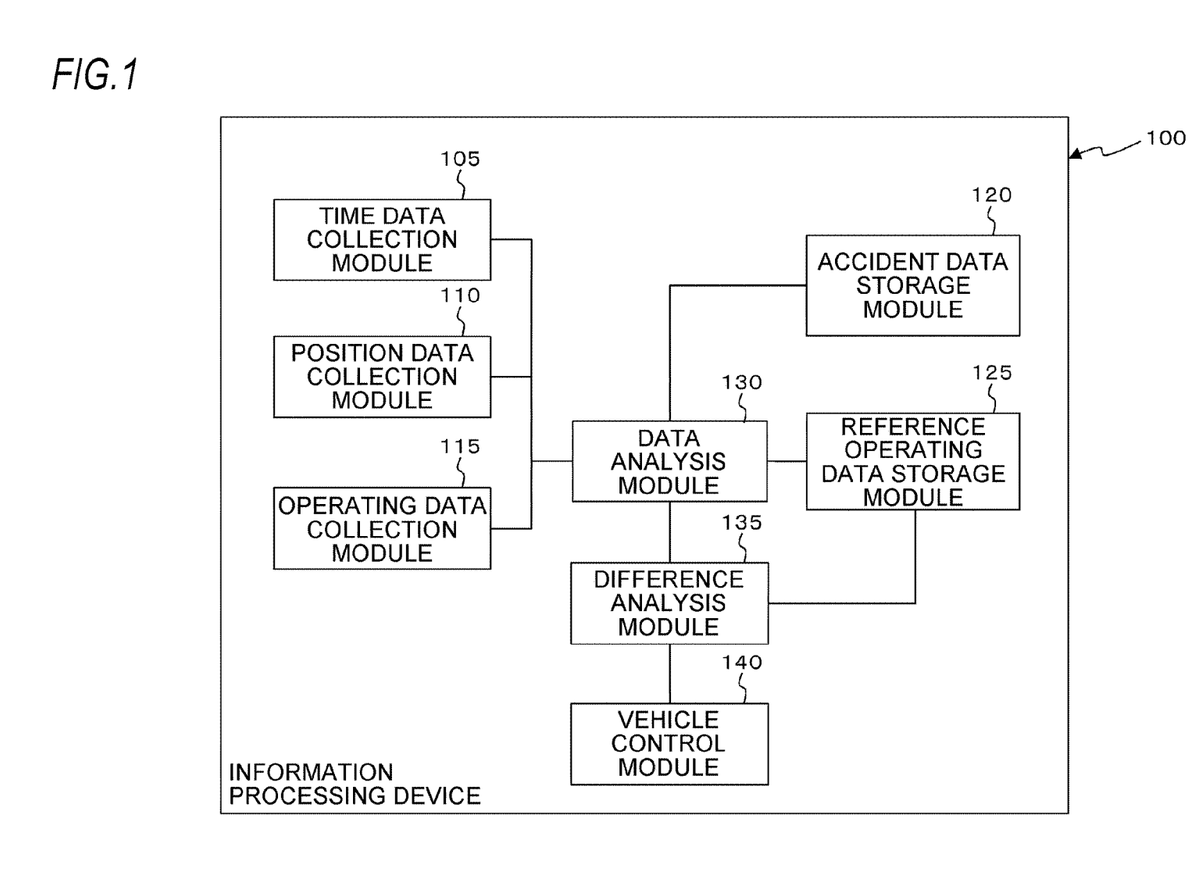
FIG. 1 is a conceptual module configuration view illustrating a configuration example of an exemplary embodiment.

FIG. 1 is a conceptual module configuration view illustrating a configuration example of the present exemplary embodiment.

A module, in general, indicates a logically separable component such as software (a computer program) or hardware. Accordingly, a module in the present exemplary embodiment indicates not only a module in a computer program but also a module in a hardware configuration. Hence, descriptions of the present exemplary embodiments also include descriptions of a computer program to function as the module (a program to cause a computer to execute each process, a program to cause a computer to function as each unit, and a program to cause a computer to implement each function), a system, and a method. Here, for convenience of descriptions, the expressions "store," "cause to store," and equivalent expressions thereto will be used, and when an exemplary embodiment is a computer program, the expressions indicate causing data or the like to be stored in a storage device or performing a control to store data or the like in a storage device. In addition, one module may correspond to one function. In implementation, however, one module may be configured as one program, plural modules may be configured as one program, and in reverse, one module may be configured as plural programs. In addition, plural modules may be executed by one computer, or one module may be executed by plural computers in a distributed or parallel environment. In addition, one module may include another module. In addition, hereinafter, the term "connection" is also used in a case of a logical connection (e.g., data exchange, instructions, and a reference relationship among data), in addition to a physical connection. The term "predetermined" refers to being determined before a target processing. Not to mention the meaning of being determined before a processing by the present exemplary embodiment, the term "predetermined" includes the meaning of being determined according to a circumstance/state at that time or a circumstance/state until that time even after a processing by the present exemplary embodiment is started, as long as a target processing has not yet started. When plural "predetermined values" exist, the values may be different from each other, or two or more of the values (including any values, of course) may be identical to each other. A description indicating that "when it is A, B is performed" is used to indicate that "whether it is A is determined, and when it is determined that it is A, B is performed," except for a case where the determination of whether it is A is unnecessary.

In addition, a system or a device includes a case where the system or the device is implemented by, for example, one computer, one hardware component, one device, or the like in addition to a case where plural computers, hardware components, devices and others are configured to be connected to each other by a communication unit such as a network (including one-to-one corresponding communication connection). The terms "device" and "system" are used to have the same meaning. Of course, the "system" does not include a system merely meaning a social "structure" (social system) which is an artificial engagement.

In addition, target information is read from a storage device per processing by each module or for each of plural processes which is executed in a module. After the processing is executed, the processing result is recorded in the storage device. Accordingly, descriptions of the reading from the storage device prior to the processing and the recording in the storage device after the processing may be omitted. In addition, the storage device may include, for example, a hard disk, a random access memory (RAM), an external storage medium, a storage device through a communication line, and a register within a central processing unit (CPU).

An information processing device 100 of the present exemplary embodiment is a control apparatus of a moving body. As illustrated in FIG. 1, the information processing device 100 includes a time data collection module 105, a position data collection module 110, an operating data collection module 115, an accident data storage module 120, a reference operating data storage module 125, a data analysis module 130, a difference analysis module 135, and a vehicle control module 140. In particular, the information processing device 100 is to perform a control for safe drive of a vehicle based on operating data.

Here, the term "moving body" refers to a vehicle used for a movement of a person or an object and includes, for example, an automobile, a two-wheeled vehicle, a train, ship, an airplane, a helicopter, a drone, and a wheelchair. The moving body may be able to communicate with the information processing device 100. Hereinafter, an automobile (an automatic driving vehicle 380) will be described as a main example of the moving object. The automobile includes, for example, an automatic driving car and an automobile called, for example, a connected car.

The automatic driving car may receive vehicle control data for an operation of the vehicle itself, in addition to a function to collect and transmit operating data of the vehicle, and operate the vehicle by using the vehicle control data. Specifically, the operating data collected and transmitted by the vehicle are analyzed, and vehicle control data for automatic driving (e.g., a traveling direction, a vehicle speed, and a steering angle) are generated. The generated vehicle control data is received, and the operation of the automatic driving car is controlled.

In order to improve the safety of an automobile (without being limited to the connected car or the automatic driving car), an operation support system such as a collision damage reduction brake or an active cruise control (ACC), or a cooperative operation support system implemented by a vehicle-to-vehicle (V2V) communication such as a cooperative active cruise control (CACC) has been developed.

The time data collection module 105 is connected to the data analysis module 130. The time data collection module 105 collects data of current date and time (year, month, day, hour, minute, second, a fraction of a section, or a combination thereof). For example, the time data collection module 105 may collect date and time data from a clock equipped in a moving body or acquire date and time from a time server via a communication line.

The position data collection module 110 is connected to the data analysis module 130. The position data collection module 110 acquires position data (e.g., longitude, and latitude) of the automatic driving vehicle 380. The position data may be collected from, for example, a global positioning system (GPS), a beacon, and an electronic toll collection (ETC) system.

The operating data collection module 115 is connected to the data analysis module 130. The operating data collection module 115 collects operating data from a variety of sensors. The operating data collection module 115 is provided to detect an operating status of the automatic driving vehicle 380. The operating data include, for example, speed data, number of engine revolutions, shift gear position data, accelerator opening data, and steering angle data. In addition, the operating data collection module 115 may collect operating data such as a travelling direction, atmospheric humidity, a longitudinal inclination angle, an atmospheric temperature, a lateral inclination angle, a vehicle speed, and a travel distance.

The variety of sensors may include sensors for detecting a failure of parts contained in the automatic driving vehicle 380, particularly, parts (e.g., brake and engine) used for the movement of the automatic driving vehicle 380.

The accident data storage module 120 is connected to the data analysis module 130. The accident data storage module 120 stores date and time data, position data, and operating data in case of an accident. The date and time data, position data, and operating data in case of an accident may include a predetermined period A before the accident occurs and a predetermined period B after the accident occurs, in addition to date and time data, position data, and operating data at the time (moment) when the accident occurs. The period A and the period B may have the same value or different values. In particular, only the predetermined period A before the accident occurs may be included. This is because the operating data may not be often suitable for prediction of the accident after the accident occurs. The position data may be a predetermined region including a position at which the accident occurs. For example, the position data may be a circle region with a predetermined distance as a radius centered at the position at which the accident occurs or may be a predetermined section C until the vehicle arrives at the position at which the accident occurs or a predetermined section D from the position at which the accident occurs. In particular, only the predetermined section C until the vehicle arrives at the position at which the accident occurs may be included. This is because the operating data may not be often suitable for prediction of the accident after the accident occurs.

In addition, in case of plural accidents in any date and time and any position, the operating data may use statistical values such as a mean, a median, and a mode of the operating data. Here, "any date and time" may include a period of time including no month and day (e.g., 17:00 to 19:00 defining the evening), limited days (e.g., 29 to 31 defining the end of the month), limited days of the week (e.g., Saturday, Sunday and national holiday defining the holidays), and limited months (e.g., December to February defining the winter).

As a matter of course, the data in the accident data storage module 120 may include operating data in case of an accident in a different vehicle, in addition to operating data in case of an accident in a vehicle equipped with the information processing device 100. In many cases, the data in the accident data storage module 120 may be the operating data in case of an accident in a different vehicle.

Figure 6:
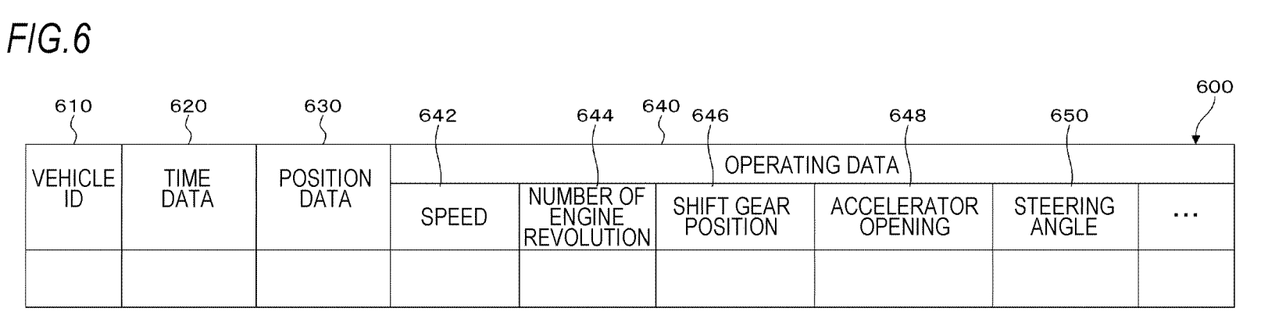
FIG. 6 is an explanatory view illustrating an example of a data structure of an operating data table.

For example, the accident data storage module 120 stores an operating data table 600. FIG. 6 is an explanatory view illustrating an example of a data structure of the operating data table 600. The operating data table 600 includes a vehicle ID field 610, a time data field 620, a position data field 630, and an operating data field 640. The operating data field 640 includes a speed field 642, a number of engine revolutions field 644, a shift gear position field 646, an accelerator opening field 648, and a steering angle field 650. In the present exemplary embodiment, the vehicle ID field 610 stores information (vehicle identification (ID)) for uniquely identifying a vehicle. The time data field 620 stores time data indicating date and time when operating data is collected in the vehicle. The position data field 630 stores position data indicating a position where operating data is collected in the vehicle. The operating data field 640 stores operating data collected at that date and time and that position in the vehicle. The speed field 642 stores speed data collected at that date and time and that position in the vehicle. The number of engine revolutions field 644 stores a number of engine revolutions collected at that date and time and that position in the vehicle. The shift gear position field 646 stores shift gear position data collected at that date and time and that position in the vehicle. The accelerator opening field 648 stores accelerator opening data collected at that date and time and that position in the vehicle. The steering angle field 650 stores steering angle data collected at that date and time and that position in the vehicle.

The reference operating data storage module 125 is connected to the data analysis module 130 and the difference analysis module 135. The reference operating data storage module 125 stores reference operating data. Here, when a difference between operating data A within the accident data storage module 120 (corresponding to second operating data in case of an accident) and operating data B in case of no accident meets a predetermined condition, the reference operating data is generated based on the operating data B. Here, the operating data A and the operating data B are both associated with date and time data and position data. The operating data A and the operating data B used to calculate the difference are operating data B associated with date and time data and position data corresponding respectively to date and time data and position data of any operating data A. Specifically, operating data A and operating data B having the same date and time data and position data are objects of comparison. Here, "corresponding" is not limited to identical (exactly the same) date and time data but may include a case where a difference between date and time data is equal to or smaller than a predetermined threshold. Here, "date and time" may include a period of time including no month and day (e.g., 17:00 to 19:00 defining the evening), limited days (e.g., 29 to 31 defining the end of the month), limited days of the week (e.g., Saturday, Sunday, and national holiday defining the holidays), and limited months (e.g., December to February defining the winter).

Similarly, "corresponding" of the position data is not limited to identical (exactly the same) position data but may include a case where a difference between position data is equal to or smaller than a predetermined threshold.

The reference operating data may use a statistical value of plural operating data B, such as a mean, a median, and a mode of the operating data B.

The reference operating data have the same data structure as, for example, the operating data table 600. In addition, "predetermined condition" may include a condition where a difference between the operating data A and the operating data B is equal to or larger than a predetermined threshold. That is, this condition is generated based on the operating data B when there is a meaningful difference between the operating data A in case of an accident and the operating data B in case of no accident.

The data analysis module 130 is connected to the time data collection module 105, the position data collection module 110, the operating data collection module 115, the accident data storage module 120, the reference operating data storage module 125, and the difference analysis module 135. The data analysis module 130 collects date and time data, position data, and operating data of a vehicle as a moving body from the time data collection module 105, the position data collection module 110, and the operating data collection module 115, respectively. Then, the data analysis module 130 extracts reference operating data, which correspond to the date and time data collected from the time data collection module 105 and the position data collected from the position data collection module 110, from the reference operating data storage module 125.

In addition, the data analysis module 130 may generate reference operating data while a vehicle is travelling. That is, the data analysis module 130 may extract second operating data in case of an accident corresponding to the date and time data collected by the time data collection module 105 and the position data collected by the position data collection module 110, from the accident data storage module 120, and generate the reference operating data based on the operating data collected by the operating data collection module 115 when a difference between the operating data collected by the operating data collection module 115 and the second operating data is equal to or larger than a predetermined threshold.

In addition, the data analysis module 130 may collect date and time data, position data, and operating data of a vehicle from the time data collection module 105, the position data collection module 110, and the operating data collection module 115, respectively, in a road section where the number of accidents is equal to or larger than a predetermined threshold. That is, a control using a difference between the operating data and the reference operating data may be performed only for a region where an accident is likely to occur (e.g., a road section). Here, "the number of accidents" may be the total sum of accidents up to now, the sum of accidents in a predetermined period, or the sum of accidents in a period of time including the current time. The "period of time including the current time" may be, for example, a period of time partitioned every two hours or a period of time of one hour before and after the current time.

The difference analysis module 135 is connected to the reference operating data storage module 125, the data analysis module 130, and the vehicle control module 140. The difference analysis module 135 calculates a difference between the reference operating data extracted by the data analysis module 130 from the reference operating data storage module 125 and the current operating data (the operating data collected by the operating data collection module 115). Then, the difference analysis module 135 determines whether or not the difference meets a predetermined condition. The "predetermined condition" includes a condition where the difference is equal to or larger than a predetermined threshold or the like. When the difference meets the predetermined condition, the vehicle control module 140 controls the vehicle. When the difference does not meet the predetermined condition, it is unnecessary for the vehicle control module 140 to control the vehicle.

The vehicle control module 140 is connected to the difference analysis module 135. The vehicle control module 140 controls the vehicle based on a result of comparison (difference) between the reference operating data and the current operating data. For example, when a difference between a speed as the operating data and a speed as the reference operating data is larger than a predetermined threshold, a control such as deceleration to make the operating data close to the reference operating data is performed.

Figure 2:
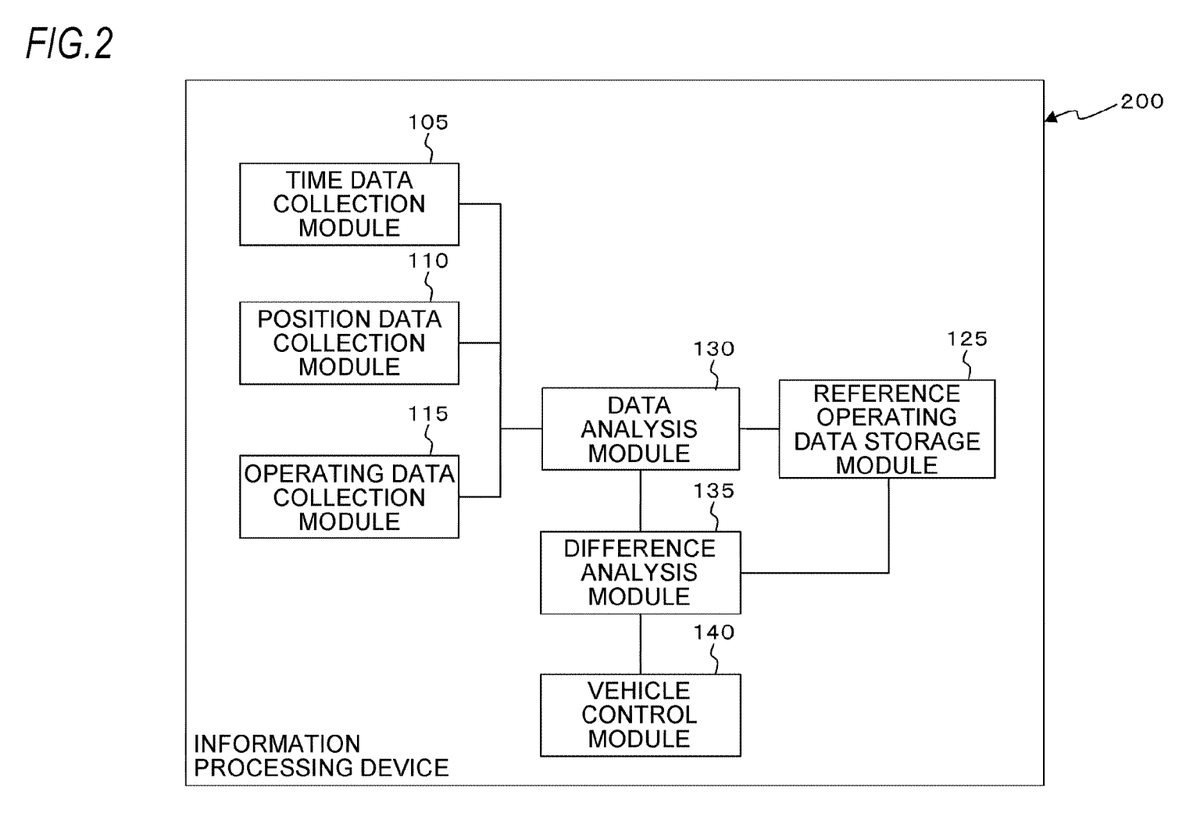
FIG. 2 is a conceptual module configuration view illustrating a configuration example of the present exemplary embodiment.

FIG. 2 is a conceptual module configuration view illustrating a configuration example of the present exemplary embodiment.

Although the information processing device 100 illustrated in the example of FIG. 1 includes an example of generating the reference operating data using also the operating data while the vehicle is travelling, the accident data storage module 120 may not be necessary when the reference operating data is generated in advance. An information processing device 200 illustrated in the example of FIG. 2 is obtained by excluding the accident data storage module 120 from the information processing device 100 and accordingly includes the time data collection module 105, the position data collection module 110, the operating data collection module 115, the reference operating data storage module 125, the data analysis module 130, the difference analysis module 135, and the vehicle control module 140. The same elements as those of the information processing device 100 will be denoted by the same reference numerals as used for the elements of the information processing device 100, and overlapping explanation thereof will be omitted.

The time data collection module 105 is connected to the data analysis module 130.

The position data collection module 110 is connected to the data analysis module 130.

The operating data collection module 115 is connected to the data analysis module 130.

The reference operating data storage module 125 is connected to the data analysis module 130 and the difference analysis module 135.

The data analysis module 130 is connected to the time data collection module 105, the position data collection module 110, the operating data collection module 115, the reference operating data storage module 125, and the difference analysis module 135.

The difference analysis module 135 is connected to the reference operating data storage module 125, the data analysis module 130, and the vehicle control module 140.

The vehicle control module 140 is connected to the difference analysis module 135.

Figure 3:
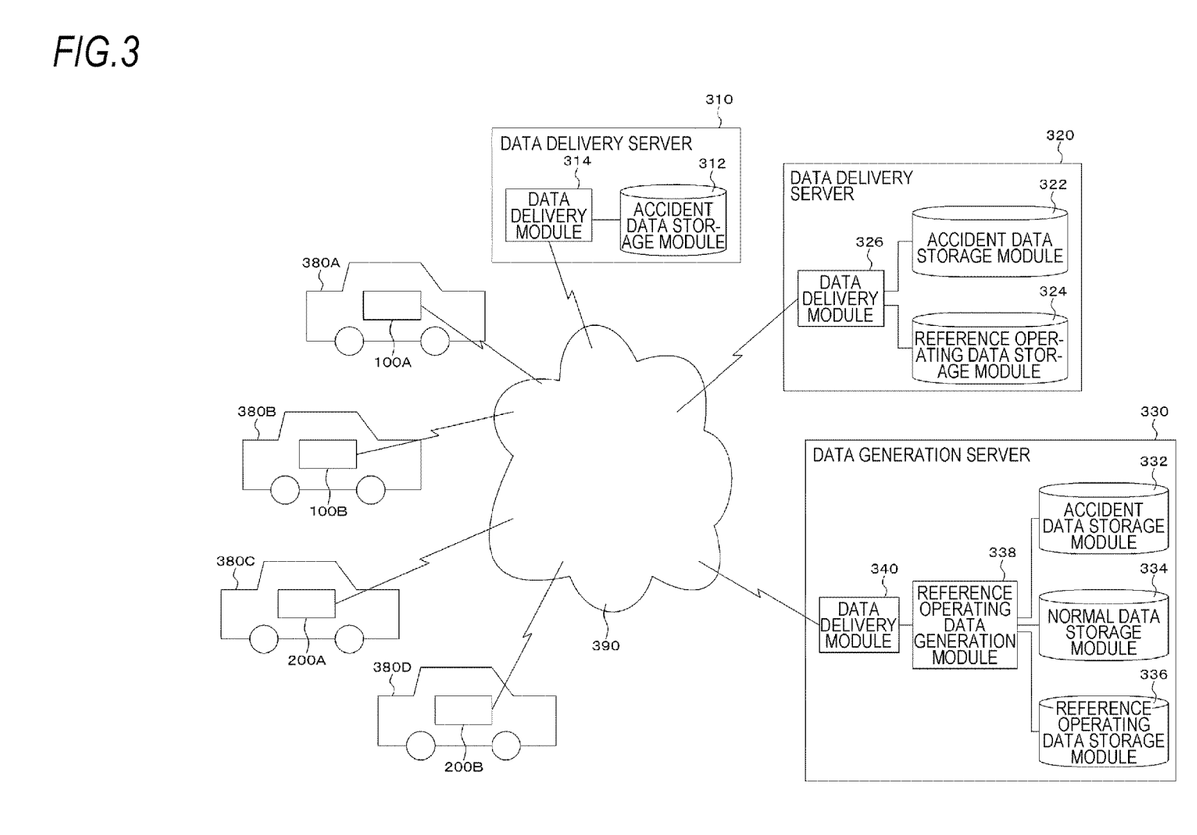
FIG. 3 is an explanatory view illustrating a configuration example of a system using the present exemplary embodiment.

FIG. 3 is an explanatory view illustrating a configuration example of a system using the present exemplary embodiment.

An automatic driving vehicle 380A includes an information processing device 100A. An automatic driving vehicle 380B includes an information processing device 100B. An automatic driving vehicle 380C includes an information processing device 200A. An automatic driving vehicle 380D includes an information processing device 200B.

The information processing device 100A of the automatic driving vehicle 380A, the information processing device 100B of the automatic driving vehicle 380B, the information processing device 200A of the automatic driving vehicle 380C, the information processing device 200B of the automatic driving vehicle 380D, a data delivery module 314 of a data delivery server 310, a data delivery module 326 of a data delivery server 320, and a data delivery module 340 of a data generation server 330 are interconnected via a communication line 390. Although the communication between the communication line 390 and the automatic driving vehicle 380 is a wireless communication, the internal of the communication line 390 may be wireless, wired, or a combination thereof, and, for example, the Internet as a communication infrastructure. In addition, the functions by the data delivery server 310, the data delivery server 320, and the data generation server 330 may be implemented with a cloud service.

The data delivery server 310 includes an accident data storage module 312 and the data delivery module 314.

The accident data storage module 312 and the data delivery module 314 are interconnected. The accident data storage module 312 has the same function as the accident data storage module 120. The data delivery module 314 transmits data in the accident data storage module 312 to each automatic driving vehicle 380. The transmitted data is stored in the accident data storage module 120 within the information processing device 100 (the information processing device 100A and the information processing device 100B) of the automatic driving vehicle 380 (the automatic driving vehicle 380A and the automatic driving vehicle 380B). In addition, the data delivery module 314 may transmit data to the data analysis module 130 in the information processing device 200 (the information processing device 200A and the information processing device 200B) of the automatic driving vehicle 380 (the automatic driving vehicle 380C and the automatic driving vehicle 380D) such that reference operating data is generated in the data analysis module 130.

The data delivery server 320 includes an accident data storage module 322, a reference operating data storage module 324, and the data delivery module 326.

The accident data storage module 322 and the reference operating data storage module 324 are connected to the data delivery module 326. The accident data storage module 322 has the same function as the accident data storage module 120. The reference operating data storage module 324 has the same function as the reference operating data storage module 125. The data delivery module 326 has the same function as the data delivery module 314 of the data delivery server 310 and transmits data in the accident data storage module 322 to the automatic driving vehicle 380. In addition, the data delivery module 326 stores the data in the accident data storage module 120 within the information processing device 100 of the automatic driving vehicle 380 or transmits the data to the data analysis module 130 in the information processing device 200 such that reference operating data is generated in the data analysis module 130. The data delivery module 326 transmits data in the reference operating data storage module 324 to each automatic driving vehicle 380. Then, the data delivery module 326 stores the data in the reference operating data storage module 125 within the information processing device 100 (or the information processing device 200) of each automatic driving vehicle 380.

The data generation server 330 includes an accident data storage module 332, a normal data storage module 334, a reference operating data storage module 336, a reference operating data generation module 338, and the data delivery module 340.

The accident data storage module 332, the normal data storage module 334, and the reference operating data storage module 336 are connected to the reference operating data generation module 338. The accident data storage module 332 has the same function as the accident data storage module 120. The accident data storage module 332 stores data (data extracted by the time data collection module 105, the position data collection module 110, and the operating data collection module 115) received by the data delivery module 340 from each automatic driving vehicle 380 (an automatic driving vehicle 380 in which an accident occurs). The normal data storage module 334 stores data (data extracted by the time data collection module 105, the position data collection module 110, and the operating data collection module 115) received by the data delivery module 340 from each automatic driving vehicle 380. In addition, the normal data storage module 334 stores data in case of no accident. The reference operating data storage module 336 has the same function as the reference operating data storage module 125.

The reference operating data generation module 338 is connected to the accident data storage module 332, the normal data storage module 334, the reference operating data storage module 336, and the data delivery module 340. The reference operating data generation module 338 generates reference operating data using the operating data in the accident data storage module 332 and the operating data in the normal data storage module 334 and stores the generated reference operating data in the reference operating data storage module 336. That is, the reference operating data generation module 338 has the same function as the data analysis module 130. Specifically, data received from the time data collection module 105, the position data collection module 110, and the operating data collection module 115 may be treated as data extracted from the normal data storage module 334.

The data delivery module 340 is connected to the reference operating data generation module 338. The data delivery module 340 has the same function as the data delivery module 326 of the data delivery server 320 and transmits data in the accident data storage module 332 to the automatic driving vehicle 380. In addition, the data delivery module 340 stores the data in the accident data storage module 120 within the information processing device 100 of the automatic driving vehicle 380 or transmits the data to the data analysis module 130 in the information processing device 200 such that reference operating data is generated. The data delivery module 340 transmits data in the reference operating data storage module 336 to each automatic driving vehicle 380. Then, the data delivery module 340 stores the data in the reference operating data storage module 125 within the information processing device 100 (or the information processing device 200) of each automatic driving vehicle 380.

Figure 4:
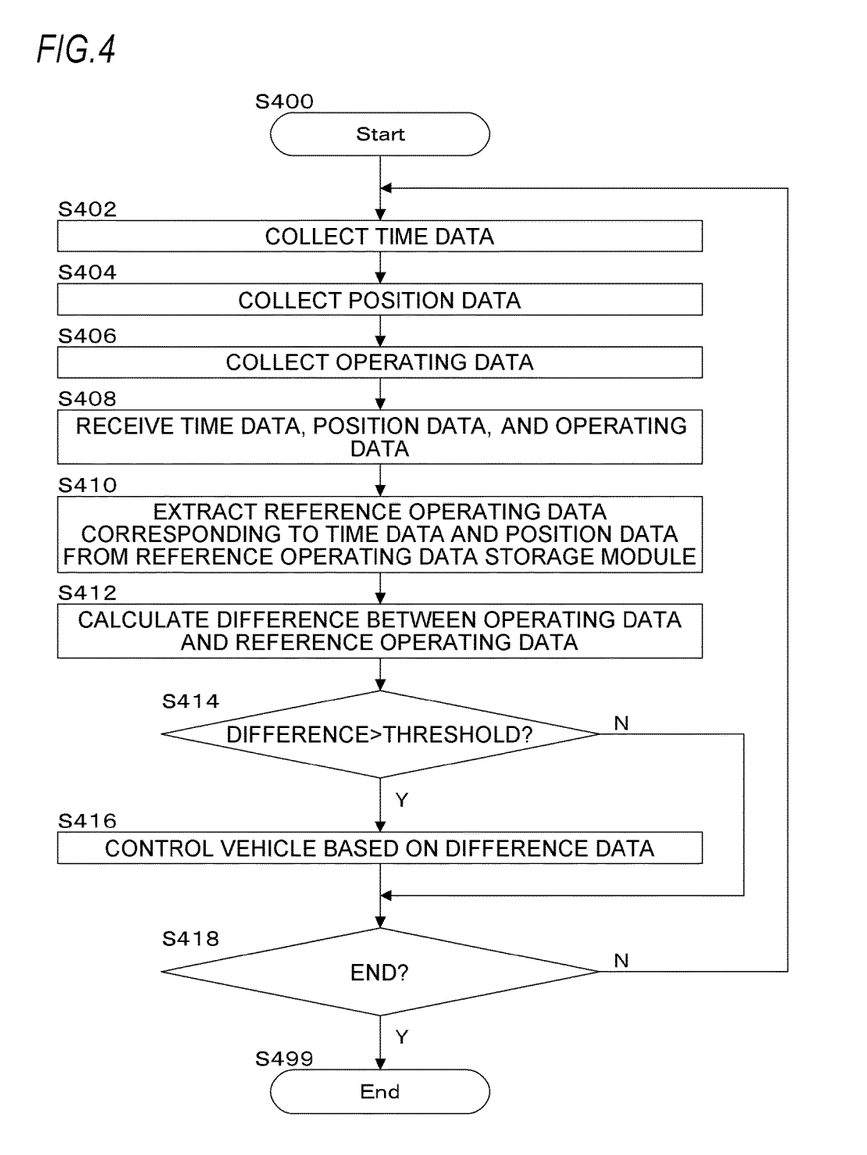
FIG. 4 is a flow chart illustrating an example of a process according to the present exemplary embodiment.

FIG. 4 is a flow chart illustrating an example of a process according to the present exemplary embodiment. FIG. 4 illustrates an example of a process of controlling the travelling of the automatic driving vehicle 380.

At Step S402, the time data collection module 105 collects time data.

At Step S404, the position data collection module 110 collects position data.

At Step S406, the operating data collection module 115 collects operating data.

At Step S408, the data analysis module 130 receives the time data, the position data, and the operating data from the time data collection module 105, the position data collection module 110, and the operating data collection module 115, respectively.

At Step S410, the data analysis module 130 extracts reference operating data corresponding to the time data and the position data from the reference operating data storage module 125.

At Step S412, the difference analysis module 135 calculates a difference between the operating data and the reference operating data.

At Step S414, the difference analysis module 135 determines whether "difference>threshold." When it is determined that "difference>threshold," the process proceeds to Step S416. Otherwise, the process proceeds to Step S418.

At Step S416, the vehicle control module 140 controls the vehicle based on the difference data.

At Step S418, it is determined whether to end the process. If so, the process is ended (Step S499). Otherwise, the process returns to Step S402.

Figure 5:
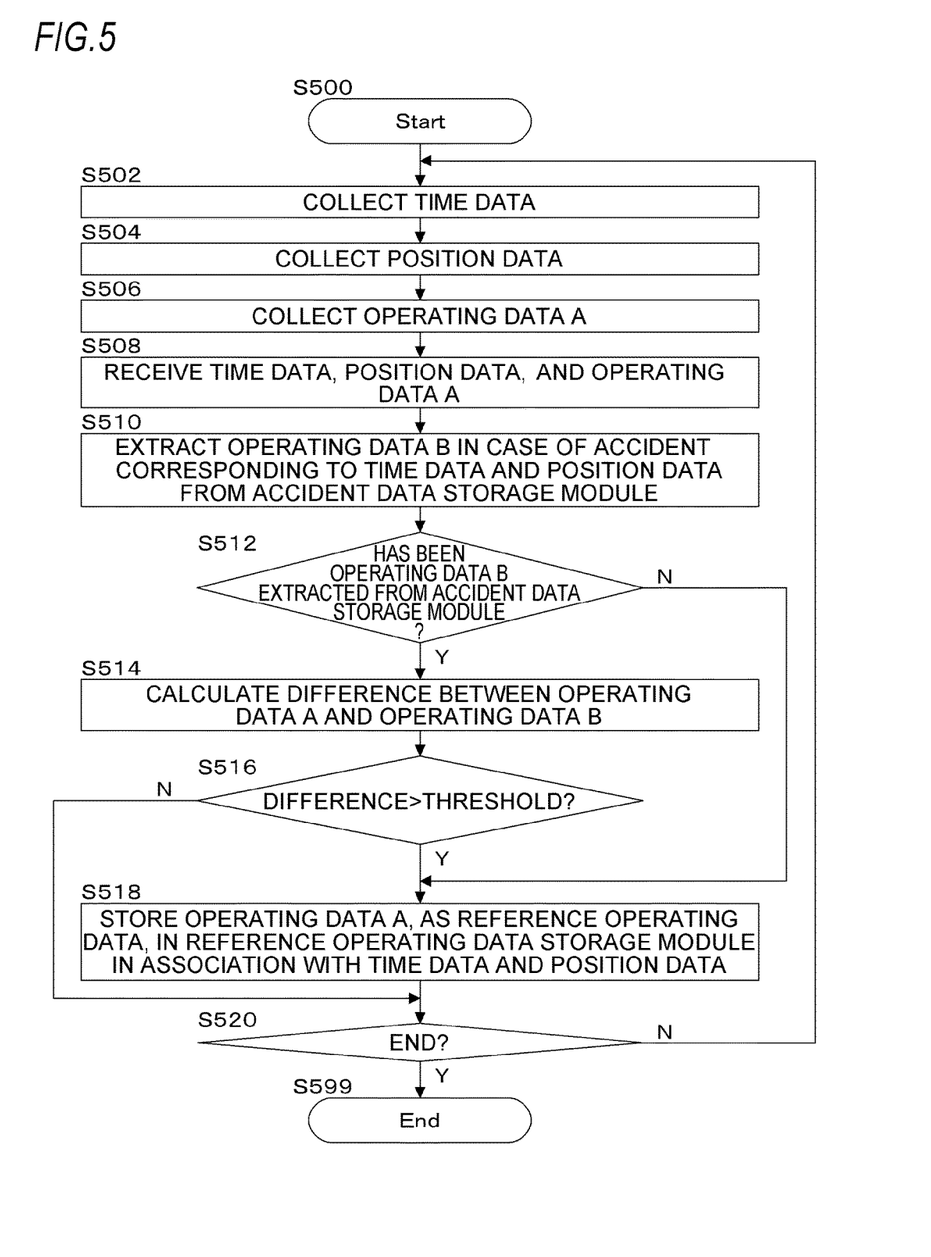
FIG. 5 is a flow chart illustrating an example of a process according to the present exemplary embodiment.

FIG. 5 is a flow chart illustrating an example of a process according to the present exemplary embodiment. FIG. 5 illustrates an example of a process of generating reference operating data using operating data while a vehicle is travelling.

At Step S502, the time data collection module 105 collects time data.

At Step S504, the position data collection module 110 collects position data.

At Step S506, the operating data collection module 115 collects operating data A.

At Step S508, the data analysis module 130 receives the time data, the position data, and the operating data A from the time data collection module 105, the position data collection module 110, and the operating data collection module 115, respectively.

At Step S510, the data analysis module 130 extracts operating data B in case of an accident corresponding to the time data and the position data from the accident data storage module 120.

At Step S512, the data analysis module 130 determines whether or not the operating data B has been extracted from the accident data storage module 120. When it is determined that the operating data B has been extracted, the process proceeds to Step S514. Otherwise, the process proceeds to Step S518.

At Step S514, the difference analysis module 135 calculates a difference between the operating data A and the operating data B.

At Step S516, the difference analysis module 135 determines whether "difference>threshold." When it is determined that "difference>threshold," the process proceeds to Step S518. Otherwise, the process proceeds to Step S520.

At Step S518, the difference analysis module 135 stores the operating data A, as reference operating data, in the reference operating data storage module 125 in association with the time data and the position data.

At Step S520, it is determined whether to end the process. If so, the process is ended (Step S599). Otherwise, the process returns to Step S502.

Figure 7:
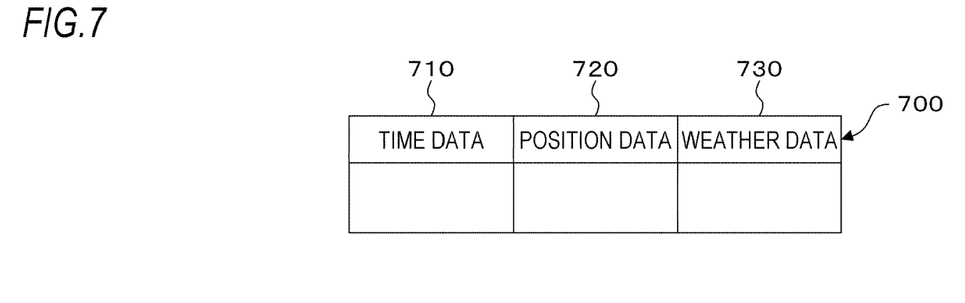
FIG. 7 is an explanatory view illustrating an example of a data structure of an environment data table.

The data analysis module 130 may stratify data received from the time data collection module 105, the position data collection module 110 and the operating data collection module 115 depending on time, a position or weather, and generate reference operating data using the stratified data. The stratification may be achieved using one of time, a position, and weather, or a combination thereof. The data analysis module 130 generates the reference operating data for each layer using, e.g., an environment data table 700. Then, the vehicle may be controlled using reference operating data of the corresponding layer at that time. FIG. 7 is an explanatory view illustrating an example of a data structure of the environment data table 700. The environment data table 700 includes a time data field 710, a position data field 720, and a weather data field 730. The time data field 710 stores time data. The position data field 720 stores position data. The weather data field 730 stores weather data. The stratification may be achieved with a predetermined range as a layer or may be achieved using a clustering method.

Figure 8:
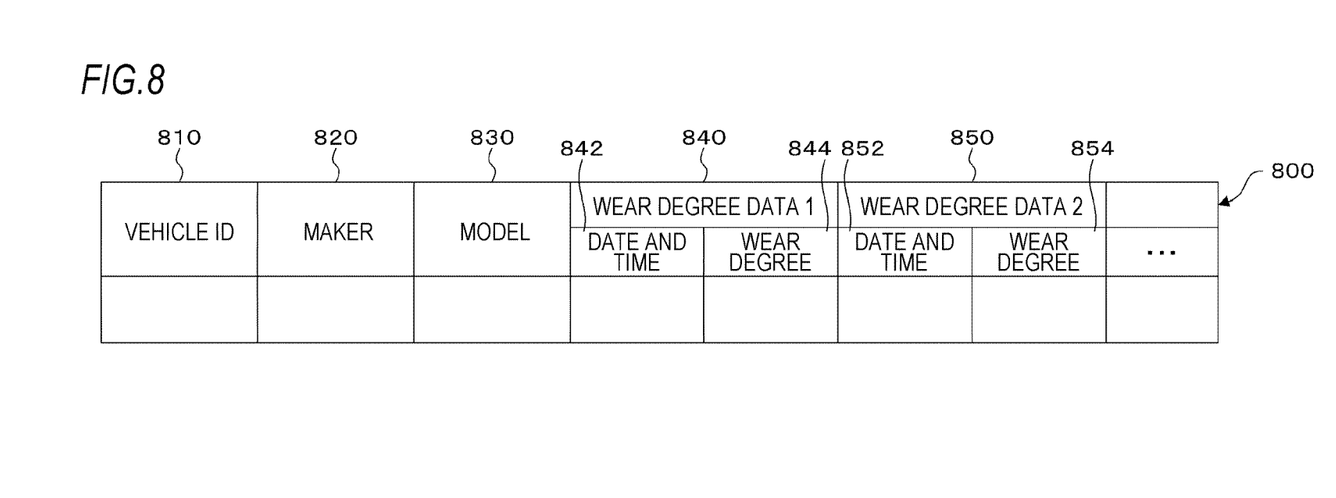
FIG. 8 is an explanatory view illustrating an example of a data structure of a vehicle data table.

In addition, the data analysis module 130 may stratify data received from the time data collection module 105, the position data collection module 110, and the operating data collection module 115 depending on a maker, a model, and a wear degree of the vehicle and generate reference operating data using the stratified data. The stratification may be achieved using one of a maker, a model, and a wear degree of the vehicle, or a combination thereof. The data analysis module 130 generates the reference operating data for each layer using, e.g., a vehicle data table 800. Then, the vehicle may be controlled using reference operating data of the corresponding layer at that time. FIG. 8 is an explanatory view illustrating an example of a data structure of the vehicle data table 800. The vehicle data table 800 includes a vehicle ID field 810, a maker field 820, a model field 830, a wear degree data 1 field 840, and a wear degree data 2 field 850. The wear degree data 1 field 840 includes a date and time field 842 and a wear degree field 844. The wear degree data 2 field 850 includes a date and time field 852 and a wear degree field 854. The vehicle ID field 810 stores a vehicle ID. The maker field 820 stores a maker of the vehicle. The model field 830 stores a model of the vehicle. The wear degree data 1 field 840 stores wear degree data 1 of the vehicle. The date and time field 842 stores date and time. The wear degree field 844 stores a wear degree at the date and time. The wear degree data 2 field 850 stores wear degree data 2 of the vehicle. The date and time field 852 stores date and time. The wear degree field 854 stores a wear degree at the date and time. An example of the wear degree may include a travel distance.

Figure 9:
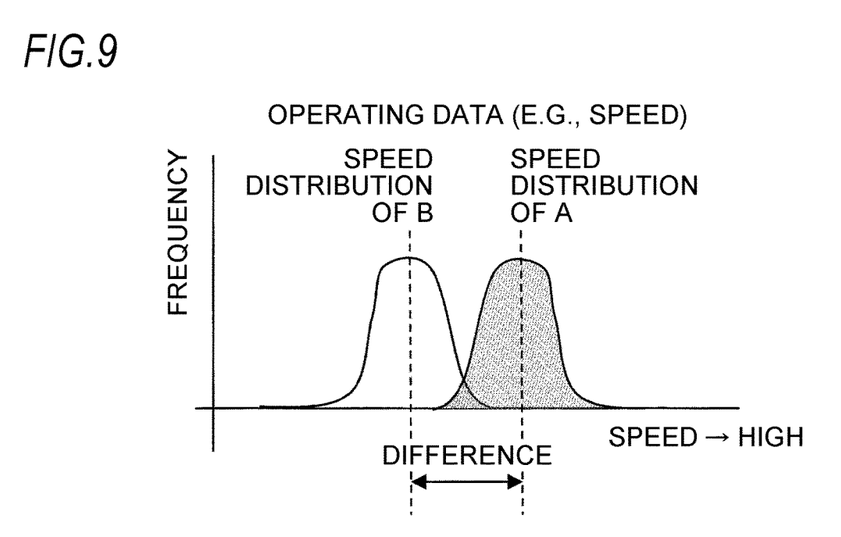
FIG. 9 is an explanatory view illustrating an example of a process according to the present exemplary embodiment.

FIG. 9 is an explanatory view illustrating an example of a process according to the present exemplary embodiment.

The horizontal axis represents the speed, and the vertical axis represents the frequency. A distribution in case of an accident is a "speed distribution of A" (indicated by a peak in the right) and a distribution in case of no accident is a "speed distribution of B" (indicated by a peak in the left). The speed is set as the reference operating data when a difference between statistical values (means, medians, modes or the like) of the distributions is equal to or larger than a predetermined threshold. Accordingly, the speed is an object to be controlled. For example, when the difference is separated by twice or more the standard deviation, the statistical value of B is set as the reference operating data.

In addition, in extracting the operating data, plural operating data may be combined to generate new operating data. For example, operating data (e.g., the Mahalanobis distance or the like) may be generated as a new index by combining three operating data, i.e., the speed, the accelerator opening, and the steering angle. Depending on the accident case, the generated operating data may provide a larger difference than one operating data and may be more effectively utilized as the reference operating data.

Figure 10:
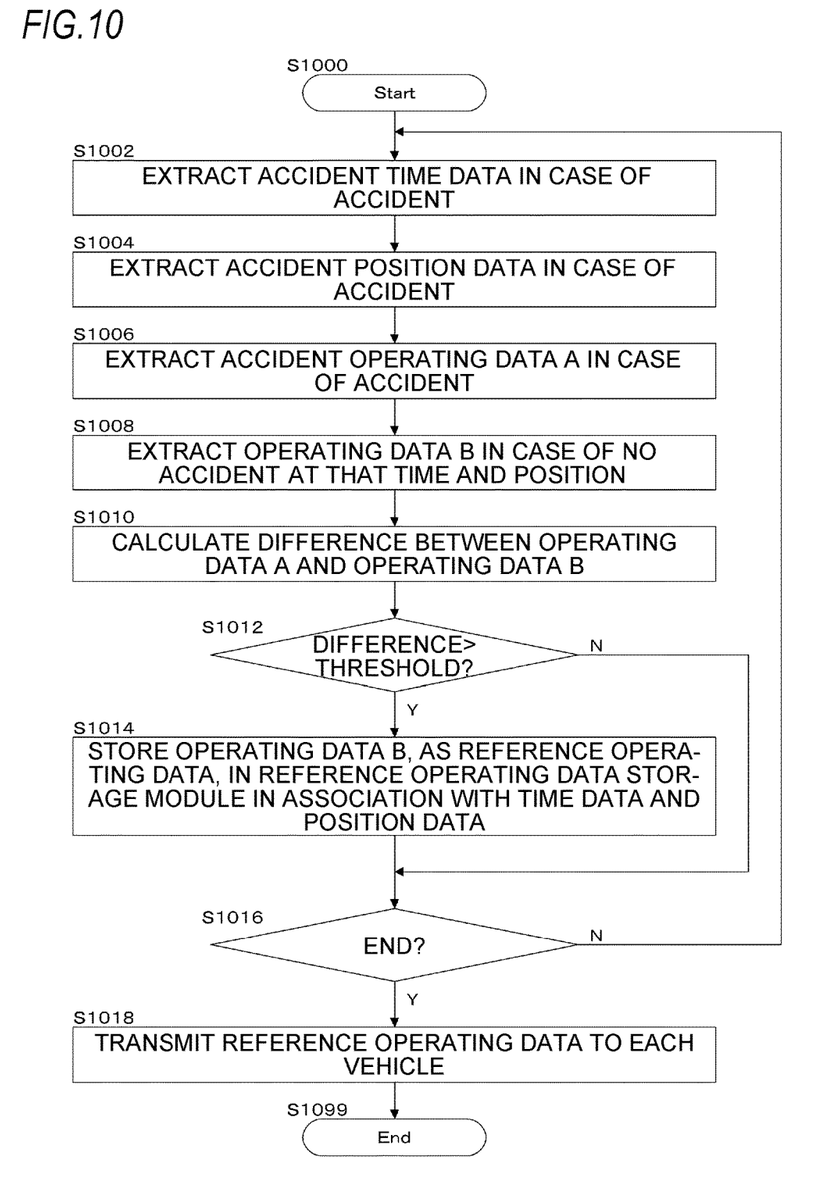
FIG. 10 is a flow chart illustrating an example of a process according to the present exemplary embodiment.

FIG. 10 is a flow chart illustrating an example of a process according to the present exemplary embodiment. FIG. 10 illustrates an example of a process by the data generation server 330 illustrated in the example of FIG. 3.

At Step S1002, the reference operating data generation module 338 extracts accident time data from the data storage module 332.

At Step S1004, the reference operating data generation module 338 extracts accident position data from the accident data storage module 332.

At Step S1006, the reference operating data generation module 338 extracts operating data A in case of an accident from the accident data storage module 332.

At Step S1008, the reference operating data generation module 338 extracts operating data B in case of no accident at that time and position, from the normal data storage module 334.

At Step S1010, the reference operating data generation module 338 calculates a difference between the operating data A and the operating data B.

At Step S1012, the reference operating data generation module 338 determines whether "difference>threshold."

When it is determined that "difference>threshold," the process proceeds to Step S1014. Otherwise, the process proceeds to Step S1016.

At Step S1014, the reference operating data generation module 338 stores the operating data B, as reference operating data, in the reference operating data storage module 125 in association with the time data and the position data.

At Step S1016, it is determined whether to end the process. If so, the process proceeds to Step S1018. Otherwise, the process returns to Step S1002.

At Step S1018, the data delivery module 340 transmits the reference operating data to each vehicle.

Figure 11:
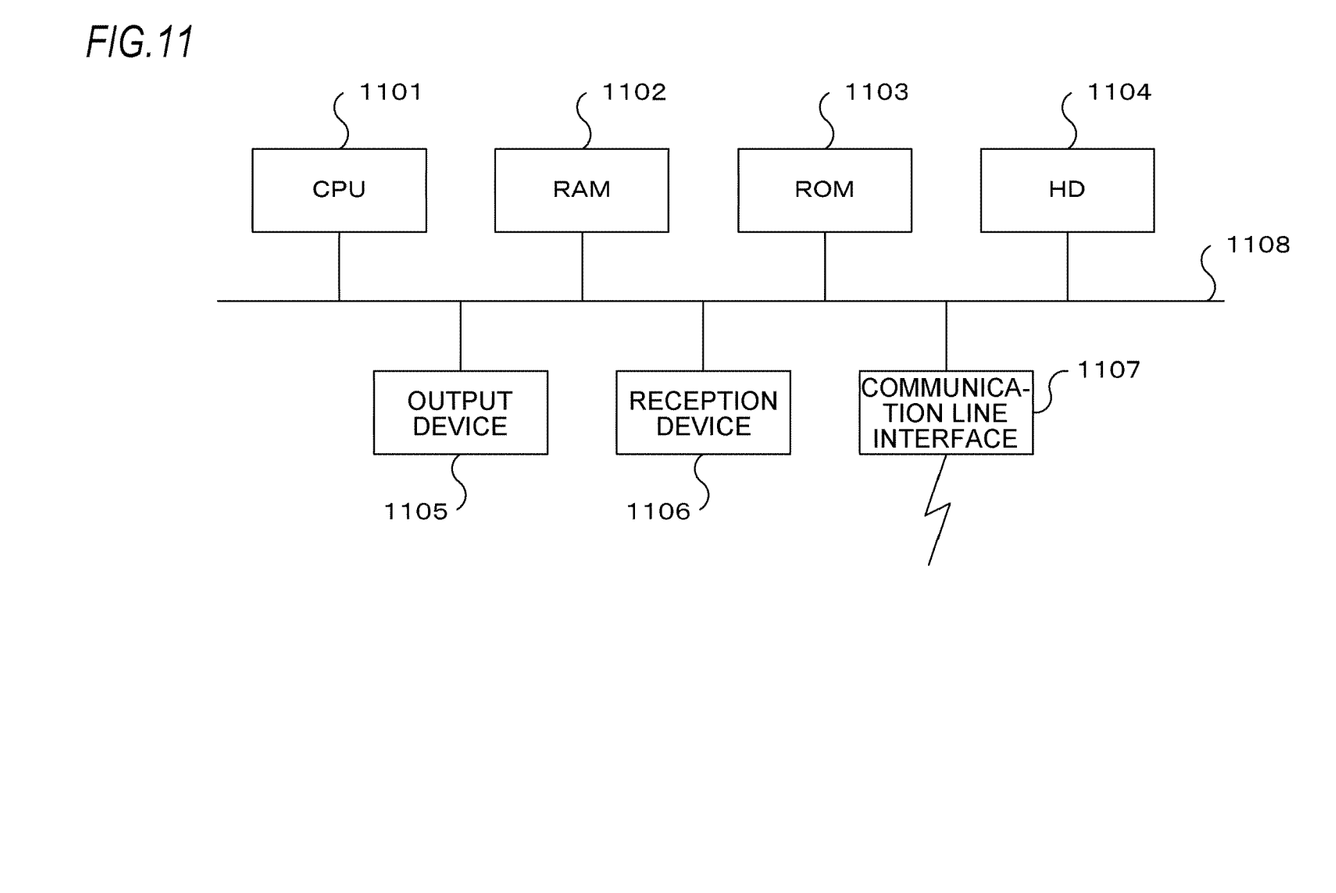
FIG. 11 is a block diagram illustrating a hardware configuration example of a computer for implementing the present exemplary embodiment.

In addition, the hardware configuration of the computers in which the programs as the present exemplary embodiment are executed is general computers as illustrated in FIG. 11, and specifically, embedded computers (also called a control computer, e.g., an electronic/engine control unit (ECU)), computers serving as servers, or the like. That is, as a specific example, a CPU 1101 is used as a processor (arithmetic unit), a RAM 1102, a ROM 1103, and an HD 1104 are used as storage devices. As for the HD 1104, for example, a hard disk or a solid state drive (SSD) may be used. The computer includes the CPU 1101 which executes programs such as the time data collection module 105, the position data collection module 110, the operating data collection module 115, the data analysis module 130, the difference analysis module 135, the vehicle control module 140 and so on, the RAM 1102 which stores the programs or data, the ROM 1103 which stores a program or the like to start the computers, the HD 1104 which is an auxiliary storage device (that may be, for example, a flash memory) having the functions of the accident data storage module 120 and the reference operating data storage module 125, a reception device 1106 which receives data based on a user's operation of a touch screen, a microphone, a keyboard, a mouse or the like or data from the variety of sensors and others, an output device 1105 which outputs control data to a liquid crystal display, a speaker or each part within the vehicle 380, a communication line interface 1107 for connection to a communication network, such as a network interface card, a bus 1108 which interconnects the above-described components to exchange data among them. These computers may be connected to each other by plural interconnection networks.

Among the above-described exemplary embodiments, the exemplary embodiments relating to computer programs are implemented by causing the computer programs as software to be read into the present hardware configuration system, and causing the software and the hardware resources to cooperate with each other. For example, the computer programs may be equipped on the operation system (OS) for a vehicle control, or inside the vehicle control OS.

In addition, the hardware configuration illustrated in FIG. 11 is a configuration example. The exemplary embodiments of the present invention are not limited to the configuration illustrated in FIG. 11, and may have any configuration that enables the execution of the modules described in the exemplary embodiments of the present invention. For example, a portion of the modules may be configured as dedicated hardware (e.g., an application specific integrated circuit (ASIC) for a specific use), and a portion of the modules may be provided within an external system and connected to the other modules through a communication line. In addition, the systems illustrated in FIG. 11 may be connected to each other by plural interconnection communication lines to operate in cooperation with each other.

In addition, the above-described programs may be provided by being stored in a recording medium, or the programs may be provided by a communication unit. In this case, for example, the above-described programs may be construed as an invention of "computer readable recording medium storing a program."

The "computer readable recording medium storing a program" indicates a computer readable recording medium storing a program, which is useful for installation, execution, distribution and others of a program.

In addition, the recording medium is, for example, a digital versatile disc (DVD) such as "DVD-R, DVD-RW, and DVD-RAM" which are formats defined in the DVD forum, and "DVD+R and DVD+RW" which are formats defined for DVD+RW, a compact disc (CD) such as a CD read only memory (CD-ROM), a CD recordable (CD-R), and a CD rewritable (CD-RW), a Blu-ray (registered trademark) disc, a magnetooptical disc (MO), a flexible disc (FD), a magnetic tape, a hard disk, a read-only memory (ROM), an electrically erasable and programmable read-only memory (EEPROM (registered trademark)), a flash memory, a random access memory (RAM), and a secure digital (SD) memory card.

In addition, all or some of the above-described programs may be saved or distributed by being recorded in the recording medium. The programs may be caused to be transmitted by a communication using a transmission medium such as a wired network, a wireless communication network, or a combination thereof used for a local area network (LAN), a metropolitan area network (MAN), a wide area network (WAN), the Internet, the Intranet, the Extranet and others. In addition, the programs may be carried by carrier waves.

Furthermore, the above-described programs may be some or the entirety of other programs, or may be recorded together with separate programs in a recording medium. In addition, the programs may be divided and recorded in plural recording media. In addition, the programs may be recorded in any form, such as compression or encryption, as long as the programs in that form may be restorable.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A vehicle control apparatus comprising:
    a memory; and
    a processor operatively coupled to the memory, the processor being configured to:
        collect date and time data, position data, and first operating data of a vehicle;
        store the collected date and time data, position data, and first operating data of the vehicle in the memory; and
        control the vehicle based on comparing reference operating data corresponding to the collected date and time data and the position data, with the first operating data, wherein
        when a difference between second operating data collected upon an accident of the vehicle and third operating data collected upon no accident satisfies a predetermined condition, the reference operating data is generated based on the third operating data.

2. The vehicle control apparatus according to claim 1, wherein the processor is further configured to:
    extract the second operating data in case of the accident corresponding to the date and time data and the position data; and
    generate the reference operating data based on the first operating data when a difference between the first operating data and the second operating data is equal to or larger than a predetermined threshold.

3. The vehicle control apparatus according to claim 2, wherein the processor collects the date and time data, the position data, and the first operating data of the vehicle in a region where a number of accidents is equal to or larger than a predetermined threshold.

4. The vehicle control apparatus according to claim 1, wherein the processor collects the date and time data, the position data, and the first operating data of the vehicle in a region where a number of accidents is equal to or larger than a predetermined threshold.

5. A vehicle control method comprising:
    collecting date and time data, position data, and first operating data of a vehicle;
    storing, in a memory, the collected date and time data, position data, and first operating data of the vehicle; and
    controlling the vehicle based on comparing reference operating data corresponding to the collected date and time data and the position data with the first operating data, wherein
    when a difference between second operating data collected upon an accident of the vehicle and third operating data collected upon no accident satisfies a predetermined condition, the reference operating data is generated based on the third operating data.

6. A non-transitory computer readable recording medium storing a vehicle control program that causes a computer to:
    collect date and time data, position data, and first operating data of a vehicle;
    store, in a memory, the collected date and time data, position data, and first operating data of the vehicle; and
    control the vehicle based on comparing reference operating data corresponding to the collected date and time data and the position data with the first operating data, wherein
    wherein, when a difference between second operating data collected upon an accident of the vehicle and third operating data collected upon no accident satisfies a predetermined condition, the reference operating data is generated based on the third operating data.

* * * * *